United States Patent Office 3,824,217
Patented July 16, 1974

3,824,217
POLYISOCYANATE-ARYL DIOXIME ADDUCTS
Wilson A. Barker, Erie, Pa., assignor to Lord Corporation, Erie, Pa.
No Drawing. Filed Nov. 22, 1972, Ser. No. 308,778
Int. Cl. C08g 22/00
U.S. Cl. 260—77.5 R                        11 Claims

ABSTRACT OF THE DISCLOSURE

Adducts of aryl dioximes and polyisocyanates are described containing from one to two moles of polyisocyanate per mole of dioxime and in which all of the oxime groups are reacted with isocyanate. These adducts are incorporated in conventional rubber-to-metal adhesive compositions to provide single-package, shelf-stable adhesives having improved adhesion.

BACKGROUND OF THE INVENTION

The present invention relates to the field of adhesives and, more particularly, to new polyisocyanate compositions which, among other uses, may be added to conventional rubber-to-metal and other adhesives to improve their adhesive properties without adversely affecting their shelf-life.

Polyisocyanates have long been noted for their adhesion promoting characteristics and have been used extensively as either the primary component of, or a desirable additive to a variety of adhesives for many years. However, due to the high reactivity of the —NCO group, it has generally been necessary to package the polyisocyanate separately from the other components of the adhesive system. This has been recognized to be a serious drawback since the convenience of a single-package, storage-stable adhesive is particularly desirable for bonding rubber to metal during the vulcanization process. One such system has been developed and is described in De Crease and Shafer U.S. Pat. 3,282,883 issued Nov. 1, 1966. This system employs ortho-alkoxyaryl diisocyanates which permit the formulation of such a single-package adhesive composition for rubber-to-metal bonding. However, the only diisocyanate of the ortho-alkoxyaryl type on the market at the present time is 3,3'-dimethoxy-4,4'-biphenylene diisocyanate or dianisidine diisocyanate (DADI) and this material is available from only one supplier and at a premium price. Therefore, there is a need for more readily available and lower-priced polyisocyanates capable of use in single-package, storage-stable rubber-to-metal adhesives.

As noted above, and in U.S. Pat. 3,282,883 issued Nov. 1, 1966, most polyisocyanates are too reactive for use in single-package rubber-to-metal adhesive compositions since they cause such systems to gel. In an attempt to develop a single-package system, several aliphatic polyisocyanates have been evaluated because of their low order of reactivity. Among these methylene bis(4-cyclohexyl isocyanate) (hydrogenated MDI), "Desmodur N" (a hexamethylene diisocyanate/water adduct available from Mobay Chemical Company) and "Dimeryl" diisocyanate (an aliphatic diisocyanate available from General Mills) have been tested as substitutes of DADI. These materials were not studied extensively for stability, however, since they were quickly found to be detrimental to the environmental resistances of the adhesives. In other attempts to produce a single-package shelf-stable adhesive without recourse to the expensive DADI, it has been found possible to produce adhesives having good storage stability, environmental resistance and bonding versatility. While these adhesives were also less expensive than the DADI-based compositions, it has been found that they cannot be used for bonding at temperatures above 385° F. Since the need for short, high temperature cures is becoming prevalent in the rubber-to-metal bonding industry, the need for a substitute for DADI remained.

DESCRIPTION OF THE PRIOR ART

As noted above the prior art is replete with suggestions for the addition of polyisocyanates to adhesive and other compositions. Among these may be mentioned Cousins U.S. Pat. 2,835,624 issued May 20, 1958 which describes a method for adhering butyl rubber to rayon tire cord by treating the cord with a solution containing 7 to 8% compounded butyl rubber in an inert solvent such as a mixture of moderately high-boiling petroleum ether diluted with toluene. This solution also contains from 5 to 50 parts by weight of an organic polyisocyanate and about 0.25 to 10 parts by weight of an aryl dinitroso compound or an aryl dioxime. The cord to be coated is dipped in the foregoing solution, dried and imbedded in butyl rubber, and then resulting product is cured. One polyisocyanate employed in these solutions was described as a mixture of diisocyanate, triisocyanate, tetraisocyanate etc. prepared by the phosgenation of an aniline-formaldehyde condensation product as described in U.S. Pat. 2,683,730 issued July 13, 1954. It is believed that this is the commercially available polymethylene poly(phenyl isocyanate) commonly available as "PAPI." Elsewhere in the Cousins patent it is stated that any organic isocyanate may be used and many specific isocyanates are listed. It is also stated that representative operable dioximes include p-quinone dioxime, naphthoquinone dioxime, toluquinone dioxime, diphenoquinone dioxime and diquinoyl dioxime. Cousins does not teach or suggest that a dioxime-isocyanate adduct is formed in or separated from the butyl rubber-containing treating solution.

Ueno et al. U.S. Pat. 3,438,922 issued Apr. 15, 1969 discloses an adhesive composition consisting of an aqueous dispersion of the reaction product of (1) an isocyanate blocking agent which may be a phenol, an active methylene compound or an oxime, and (2) a polymeric modified triisocyanate produced by the reaction of an aromatic diisocyanate with a trifunctional polyester having a molecular weight of about 1000–4000, the isocyanate groups of the reaction product being completely blocked. The useful diisocyanates include toluene diisocyanate (TDI) and methylene bis(4-phenyl isocyanate) (MDI) as well as dianisidine diisocyanate (DADI) among others. The oximes employed as blocking agents ar monoximes such as methyl ethyl ketone oxime and cyclohexanone oxime.

U.S. Pat. 2,994,672 issued Aug. 1, 1961 discloses bisphenol adducts of isocyanates, such as methylene bis (4-phenyl isocyanate) (MDI) and hexamethylene diisocyanate, useful for improving the bonding of tire cord.

Cousins U.S. Pat. 2,690,780 issued Oct. 5, 1954 relates to the compounding of butyl rubber with a mixture of an organic isocyanate and an aromatic dinitroso compound or an aromatic dioxime. This patent states that any organic isocyanate may be employed and lists a wide variety of such compounds. It is also stated that dioximes are useful in the invention and gives, as representative examples, the same dioximes listed in Cousins U.S. Pat. 2,835,624 referred to above. These dioximes are incorporated in the butyl rubber at concentrations of 0.01 to 1 part by weight together with 0.1 to 20 parts by weight of the organic isocyanate compound in order to improve the properties of the butyl rubber, both before and after vulcanization.

As noted above, De Crease and Shafer U.S. Pat. 3,282,-883 issued Nov. 1, 1966 relates to single-package, shelf-stable adhesive compositions, containing chlorinated polyethylene, certain isocyanates and dinitrosobenzene. These compositions are capable of standing for long periods of time without gelling and are useful for bonding a wide variety of elastomers, including previously cured elastomers and unvulcanized elastomers, either to themselves or to other solid substrates. The preferred diisocyanate for use in these compositions is the expensive 3,3'-dimethoxy-4,4'-biphenylene diisocyanate (DADI).

It will be apparent from the foregoing discussion of the background of the invention and the prior art that a need still remains in the art for a single-package, shelf-stable, rubber-to-metal adhesive capable of use under stringent short time, high temperature curing conditions and for polyisocyanates capable of providing improved adhesion in such compositions without seriously shortening their shelf-life.

It is an object of the present invention, therefore, to provide new polyisocyanates capable of imparting improved adhesion to rubber-to-metal adhesives and which also permit the formulation of non-gelling, shelf-stable, single-package adhesive compositions.

It is another object of the invention to provide such new polyisocyanates which are easily prepared from available materials and which are relatively inexpensive in comparison to those isocyanates of the prior art which were capable of providing shelf-stable adhesives.

The foregoing and other objects of the invention are provided by the novel polyisocyanate adducts and adhesive compositions described below.

SUMMARY OF THE INVENTION

The present invention relates to novel adducts derived from aryl dioximes and any organic polyisocyanate; the term "polyisocyanate," as employed herein, being intended to exclude monoisocyanates but to include all polyisocyanates including, without limitation, the diisocyanates, triisocyanates and higher polyisocyanates. Presently available polyisocyanates, including the polymeric compounds, have no more than about five isocyanate groups per molecule on the average, but there is no reason to believe that still higher polyisocyanates would not be operable in the invention.

The new adducts are characterized by the fact that all of the oxime groups of the dioxime moiety are reacted with isocyanate and by the fact that the molar ratio of the polyisocyanate moiety to the dioxime moiety of the adduct is in the range from 2:1 maximum to 1:1 minimum. The preferred adducts have a molar ratio of polyisocyanate moiety to dioxime moiety of about 2:1.

The new adducts can be produced by adding the two reactive moieties, the aromatic dioxime and polyisocyanate, together in the presence of a reaction medium such as an inert organic liquid. This may be done, for example, by rapidly adding the polyisocyanate to a slurry of the aromatic dioxime in an inert organic liquid. Alternatively, a slurry of the aromatic dioxime in an inert organic liquid may be added slowly to a solution of the polyisocyanate in an inert organic solvent. In any event, in order to achieve complete reaction of the oxime groups of the dioxime with isocyanate, it is essential that at least the stoichiometric equivalent and preferably an excess of isocyanate be employed. In general, it has been found that the molar ratio of the polyisocyanate reactant to the dioxime reactant should be in the range from 1:1 up to about 2.5:1. In this way the essential stoichiometric proportion of isocyanate to oxime group is always obtained. While the molar ratio of polyisocyanate to dioxime may exceed 2.5:1, this is uneconomic since the resulting adduct can not have such a ratio of greater than 2:1. The solid reaction product is separated from the liquid reaction medium by any suitable means such as filtration, washed with a suitable inert organic solvent to remove any unreacted polyisocyanate, and dried by conventional means such as in a vacuum oven. It will be obvious to those skilled in the art that the reactants, reaction medium, reaction vessel and washing liquid should be dry, i.e., free from water, since the isocyanate group reacts with water.

While not essential, a suitable catalyst such as triethylene diamine may be employed at a suitable concentration such as about 1%, more or less.

Any aromatic dioxime may be employed to produce the adducts of the invention, including, but not limited to, p-benzoquinone dioxime (QDO), naphthoquinone dioxime, toluquinone dioxime, diphenoquinone dioxime and diquinoyl dioxime, QDO being the preferred material.

Any suitable organic polyisocyanate can be employed so long as it contains at least two reactive isocyanate groups; monoisocyanates do not produce the adducts of the invention. Suitable polyisocyanates include, without limitation, diisocyanates such as toluene diisocyanate (TDI), either the 2,4- or 2,6-isomer or a mixture of these isomers, benzene diisocyanate and dimers and trimers of these diisocyanates, methylene bis (4-phenyl isocyanate) (MDI) and the corresponding saturated compound methylene bis (4-cyclohexyl isocyanate) (hydrogenated MDI) among others; and higher polyisocyanates including the polyisocyanate of hexamethylene diamine urea condensate, and polymethylene poly(phenyl isocyanate), i.e., polymeric MDI.

Any suitable anhydrous inert organic liquid may be employed as the reaction medium, solvent or washing liquid. Among such liquids, toluene, trichloroethylene (TCE) and methyl ethyl ketone (MEK) are preferred because of their ready availability.

The reaction conditions will vary somewhat, as would be expected, depending upon the relative reactivity of the reactants, whether or not a catalyst is employed, the concentration of the reactants and catalyst, and so forth. With some reactants the reaction will proceed at room temperature and go to completion in a short time without a catalyst, whereas with other reactants it may be necessary to employ a catalyst and somewhat elevated temperatures up to about 70° C. in order to complete the reaction in a convenient time period.

DETAILED DESCRIPTION OF THE INVENTION

The invention will now be described in greater detail in conjunction with the following specific examples thereof.

PRODUCTION OF THE ADDUCTS

Example 1

One mole of p-benzoquinone dioxime (QDO) powder was added rapidly with stirring to two moles of methylene bis (4-phenyl isocyanate) (MDI) in 1900 grams of methyl ethyl ketone. The reaction was catalyzed with 3.2 grams of triethylene diamine (available under the trademark "Dabco" from Houdry Process and Chemical Company). After two hours stirring at 60° C. the solid product was separated from the reaction medium by filtration, washed with methyl ethyl ketone and dried in a vacuum oven. The dry product (QDM) was found to contain 13.5% —NCO compared to the theoretical value of 13.15% calculated for the formula

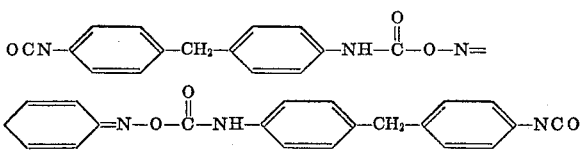

Example 2

One mole of toluene diisocyanate (TDI) was added to a slurry of QDO in methyl ethyl ketone which had previously been prepared in a conventional ball mill. The solids content of the resulting reaction mixture was 25%. Triethylene diamine catalyst (0.9%) was added and the reaction mixture was stirred until the reaction was complete. The resulting TDI-QDO-TDI adduct (QDT) was found to have a —NCO content of 14.5% compared to the theoretical 17.3%.

Example 3 p-Benzoquinone dioxime (QDO) was added to toluene and blended in a conventional dispersion mill (Kady type) to produce a slurry having a solids content of 13%. This QDO slurry was then added slowly to a warm solution (34% solids) of methylene bis(4-phenyl isocyanate) (MDI) in toluene in a resin kettle. The reaction mixture was stirred for three hours, and the solid product separated by filtration. After washing with toluene and drying the MDI-QDO-MDI adduct (QDM) was found to have a —NCO content of 13.3% compared to the theoretical value of 13.15%.

The general procedure of Example 3 was employed in a series of further adduct preparations employing various reactants. The time of addition of the aryl dioxime slurry was varied from a few seconds to as long as one hour. Some batches were run at room temperature although it was found desirable as a rule to heat the reaction mixture to about 50 to 70° C. Various dry, inert organic liquids were employed as the reaction medium, solvent and washing liquids, including trichloroethylene, toluene and methyl ethyl ketone. The identity of the inert organic liquid is apparently immaterial. Various molar ratios of polyisocyanate to aromatic dioxime from above 2:1 down to 1:1 were employed without materially affecting the rate of the reaction. Other diisocyanates which were employed under these conditions to prepare adducts with QDO included the alicyclic compound methylene bis(4-cyclohexyl isocyanate) (hydrogenated MDI) which is available from E. I. du Pont de Nemours and Company under the trademark "Hylene W." It will be apparent to those skilled in the art that the aducts of the invention can also be prepared according to the same general procedure from QDO or other aromatic dioximes and any available diisocyanate or higher polyisocyanate. A wide variety of these materials are available under the trademarks "Mondur" from Mobay Chemical Company, "Niax" from Union Carbide, "PAPI" from the Upjohn Company, "Desmodur" from Bayer, "Nacconate" from Allied Chemical and "Suprasec" from Imperial Chemical Industries. Among these polyisocyanates the polymeric MDI products sold under the trademarks "Mondur," and "PAPI" are especially interesting.

It should be noted that the adducts of the present invention do not necessarily have the simple structure represented by the 2:1 molar proportion of polyisocyanate to aromatic dioxime. Taking the adduct of p-benzoquinone dioxime (QDO) and methylene bis(4-phenyl isocyanate) (MDI) as an example, the simple ideal structure of the adduct would be

MDI-QDO-MDI.

In this adduct structure, inasmuch as MDI is a diisocyanate, each MDI moiety has one free —NCO group and the total theoretical —NCO content of the adduct is 13.15%. However, if due to the presence of free —NCO groups, this adduct reacts with as yet unreacted QDO, the following structure would be formed:

MDI-QDO-MDI-QDO.

However, in a reaction mixture containing excess isocyanate, an adduct having the foregoing structure can have only a transistory existence and will react further to give

MDI-QDO-MDI-QDO-MDI which has an —NCO content of only 8.2%. Still further reaction in the same way would produce an adduct containing only 5.9% —NCO. It will be apparent, therefore, that in the normal course events the adducts of the invention would be expected to have less than the maximum possible 13.15% NCO content of the ideal

MDI-QDO-MDI adduct. However, inasmuch as the adducts are preferably prepared in the presence of excess isocyanate, as a practical matter, they will often be found to have —NCO contents even higher than the theoretical value due to the presence of occluded excess isocyanate which is not removed in the washing step.

Utility of the adducts

While the new adducts will have many useful applications which will be apparent to those skilled in the art such as additives in fabric adhesives, and urethane elastomers, caulks and sealants, their utility will be illustrated herein as additives in rubber-to-metal adhesives. Three different adhesive compositions were prepared according to conventional techniques in a ball mill from the ingredients set forth in Table I below. In order to illustrate a shelf-stable, single-package adhesive composition of the prior art a composition containing the ingredients listed below including 20 parts of DADI was prepared according to the procedure of Example I of De Crease and Shafer U.S. Pat. 3,282,883. A second adhesive was prepared in the same way substituting an adduct of the present invention for the DADI. The adduct employed was QDM, which may be prepared according to Example I above. As a control, a third adhesive was prepared omitting any DADI, QDM or other added polyisocyanate.

TABLE I

| Ingredient, parts by weight | DADI adhesive | QDM adhesive | Control |
|---|---|---|---|
| DADI | 20.0 | | |
| QDM | | 42.0 | |
| Dinitrosobenzene | 10.0 | 10.0 | 10.0 |
| Zinc oxide | 5.0 | 5.0 | 5.0 |
| Carbon black | 10.0 | 10.0 | 10.0 |
| Dehydrating agent [1] | 2.0 | 2.0 | 2.0 |
| Chlorosulfonated polyethylene [2] | 25.0 | 25.0 | 25.0 |
| Trichloroethane xylene [3] | 25.0 | 25.0 | 25.0 |

[1] 3A molecular sieves available from the Linde Division of Union Carbide Company.
[2] "Hypalon" chlorosulfonated polyethylene available from E. I. du Pont de Nemours & Company.
[3] Sufficient xylene to give a composition of 20% total solids content.

The three adhesive compositions were used to bond natural rubber to metal previously primed with a conventional chlorinated rubber-based primer. Assemblies were made consisting of metal strips 1 inch by 2⅜ inches long to which 1 inch by 5 inch strips of natural rubber sheeting were adhered. These assemblies were cured at 400° F. for a period of four minutes. The bonded assemblies were later immersed in boiling water for two hours, removed and tested by tensioning the free end of the rubber strip against the adhesive bond at an angle of 180°. Failure occurred in the rubber rather than in the adhesive bond in all cases.

In another test on assemblies prepared and boiled in the same way, but employing styrene-butadiene rubber (SBR) in place of the natural rubber, all of the samples again gave 100% failure in the rubber rather than in the cured adhesive bond. However, the control sample gave pull values of 94 to 122 lbs., whereas the DADI adhesive gave higher pull values of 148 to 162 lbs. and the adhesive containing the QDM adduct of the present invention gave the highest pull value of all ranging from 158 to 170 lbs. It should be noted that while the DADI adhesive contained 20 parts by weight of DADI and the QDM adhesive contained 42 parts by weight of QDM, they both contained the same molar equivalent level of isocyanate, and the cost of the QDM adhesive is less than that of the DADI adhesive at such levels.

As noted above, rubber-to-metal adhesive compositions containing the new adducts may be compounded from known ingredients according to conventional dispersion techniques in available ball mills or Kady mills. The viscosity of the adhesive products can be adjusted as necessary dependent upon their intended use by proper selection of the particle size of the carbon black filler, the molecular weight or viscosity of other basic ingredients such crlorosulfonated polyethylene (e.g. grade of "Hypalon"), solvent type and solids content and other factors known to those skilled in the art. Rubber-to-metal adhesives formulated in this way employing the new adducts for improved adhesion, have been found to be shelf-stable at ambient temperatures for a year or more and for satisfactory shorter periods at elevated temperatures.

What is claimed is:

1. An adduct of p-benzoquinone dioxime and a polyisocyanate which contains from one to two moles of polyisocyanate per mole of dioxime and in which all of the oxime groups are reacted with isocyanate.

2. An adduct of claim 1 wherein the polyisocyanate is selected from the group consisting of toluene diisocyanate
toluene diisocyanate dimer
methylene bis(4-phenyl isocyanate)
methylene bis(4-cyclohexyl isocyanate)
polymeric toluene diisocyanate
polymeric methylene bis(4-phenyl isocyanate) and
hexamethylene diamine urea-polyisocyanate.

3. An adduct of claim 1 containing toluene diisocyanate and p-benzoquinone dioxime in a molar ratio of about 2:1.

4. An adduct of claim 1 containing methylene bis(4-phenyl isocyanate) and p-benzoquinone dioxime in a molar ratio of about 2:1.

5. An adduct of claim 1 containing methylene bis(4-cyclohexyl isocyanate) and p-benzoquinone dioxime in a molar ratio of about 2:1.

6. A single-package, shelf-stable adhesive composition comprising an adduct of p-benzoquinone dioxime and a polyisocyanate which contains from one to two moles of polyisocyanate per mole of dioxime and in which all of the oxime groups are reacted with isocyanate.

7. An adhesive composition according to claim 6 in which the molar ratio of polyisocyanate to dioxime is about 2:1.

8. An adhesive composition according to claim 7 in which the polyisocyanate is toluene diisocyanate.

9. An adhesive composition according to claim 7 in which the polyisocyanate is methylene bis(4-phenyl isocyanate).

10. An adhesive composition according to claim 7 in which the polyisocyanate is methylene bis(4-cyclohexyl isocyanate).

11. A rubber-to-metal adhesive composition according to claim 6.

References Cited

UNITED STATES PATENTS 2,835,624    5/1958    Cousins _____ 161—190

OTHER REFERENCES

Hong et al.: J. Polymer Sci., 10, November 1972, pp. 3405–3419.

Campbell et al.: J. Applied Polymer Sci., 2, 1959, pp. 81–85.

MAURICE J. WELSH, JR., Primary Examiner

U.S. Cl. X.R.
156—331; 260—77.5 AQ, 566 AC